(12) United States Patent
Harsch et al.

(10) Patent No.: US 7,900,649 B2
(45) Date of Patent: Mar. 8, 2011

(54) SANITARY SINGLE-LEVER MIXER

(75) Inventors: Martin Harsch, Mundelsheim (DE); Heinz Schmidt, Stuttgart (DE)

(73) Assignee: Hansa Metallwerke AG, Stuttgart (DE)

( * ) Notice: Subject to any disclaimer, the term of this patent is extended or adjusted under 35 U.S.C. 154(b) by 259 days.

(21) Appl. No.: 11/990,873

(22) PCT Filed: Aug. 3, 2006

(86) PCT No.: PCT/EP2006/007670
§ 371 (c)(1), (2), (4) Date: Feb. 21, 2008

(87) PCT Pub. No.: WO2007/022859
PCT Pub. Date: Mar. 1, 2007

(65) Prior Publication Data
US 2009/0120518 A1    May 14, 2009

(30) Foreign Application Priority Data
Aug. 25, 2005  (DE) .......................... 10 2005 040 160

(51) Int. Cl.
*F16K 31/60* (2006.01)
(52) U.S. Cl. ..................................... 137/381; 137/636.2
(58) Field of Classification Search ................. 137/381, 137/636.2
See application file for complete search history.

(56) References Cited

U.S. PATENT DOCUMENTS

| 2,675,018 | A | * | 4/1954 | Bender et al. ................. 137/381 |
| 3,422,849 | A |   | 1/1969 | Manoogian |
| 3,667,503 | A | * | 6/1972 | Farrell et al. ............... 137/625.4 |
| 3,823,742 | A | * | 7/1974 | Von Corpon ............... 137/636.3 |
| 4,562,864 | A | * | 1/1986 | Yang ............................ 137/597 |
| 4,932,433 | A |   | 6/1990 | Knapp |
| 5,494,077 | A | * | 2/1996 | Enoki et al. ............. 137/625.17 |

FOREIGN PATENT DOCUMENTS

| DE | 26 22 282 A1 | 12/1977 |
| DE | 41 13 878 A1 | 11/1991 |
| DE | 296 11 323 U1 | 9/1996 |
| EP | 0 982 441 A2 | 3/2000 |
| EP | 1 219 878 A2 | 7/2002 |
| WO | 8900275 A1 | 1/1989 |
| WO | WO0118439 A1 * | 3/2001 |

* cited by examiner

*Primary Examiner* — Kevin L Lee
(74) *Attorney, Agent, or Firm* — Factor & Lake, Ltd.

(57) ABSTRACT

A sanitary single-lever mixer comprising a housing, known per se, having a receiving compartment which is open towards the top. The housing is associated with a closing part which covers the upper opening of the receiving compartment and comprises a center passage. The adjusting lever or the handle extends through said passage. The closing part has a convex, spherical top when seen from above. The handle is associated with a cover element that has an outer exposed part with an exposed surface and a sliding element connected to the exposed part.

8 Claims, 3 Drawing Sheets

SANITARY SINGLE-LEVER MIXER

RELATED APPLICATIONS

This application claims the filing benefit of PCT Patent Application No. PCT/EP2006/007670, filed Aug. 3, 2006; which claims the benefit of German Patent Application No. 10 2005 040 160.0, filed Aug. 25, 2005; the contents of all are incorporated herein by reference.

TECHNICAL FIELD

The invention relates to a sanitary single-lever mixer having:
a) a housing which has a receiving compartment which is open towards the top;
b) a control apparatus which is disposed in said receiving compartment and has at least one movable control element which determines the flow of water, and an adjusting lever which extends upwards and can be tilted about two axes which are perpendicular to one another;
c) a handle which is connected, at one end, to the adjusting lever;
d) a closing part which is associated with the housing, covers the upper aperture in the receiving compartment and has a central through-aperture through which the adjusting shaft or the handle extends, and which closing part possesses an upper side which, viewed from above, is convex and spherical;
e) a covering part which is associated with the handle and has an underside which is essentially complementary to the upper side of the closing part and slides on said upper side when the handle moves.

BACKGROUND OF THE INVENTION

Sanitary single-lever mixers of the abovementioned type are obtainable on the market in the most varied configurations. In spite of a multiplicity of production variants in design and in the detailed configuration of the control apparatus, these have one problem in common: in order to be able to fit and service the control apparatus, it is necessary for the receiving compartment containing the control apparatus to be accessible. The upper aperture provided for that purpose in the receiving compartment must be covered in a suitable manner for two reasons. For one thing, this is a requirement from the aesthetic point of view; for another, dirt and water must be prevented from penetrating into the interior of the single-lever mixer. A closing part which is provided with a spherical upper side is therefore put on above the aperture in the receiving compartment. Either the adjusting lever or the handle must pass through said closing part, for which reason the latter possesses a central through-aperture.

In order to enable the adjusting lever or the handle to perform the movements required when adjusting the control element, this central through-aperture must not be too small. A further measure is therefore required, as a result of which the through-aperture in the closing part, which aperture is already somewhat smaller—compared with the upper aperture in the receiving compartment—is covered in turn. This takes place with the aid of a covering part which is connected to the handle and which slides, with its spherical underside, on the upper side of the closing part. Said covering part is so dimensioned that it covers the through-aperture in the closing part in all the positions of the handle.

Since it is not possible to obtain ideal, play-free sliding of the covering part, which is connected to the handle, on the closing part, which is associated with the housing, and extremely small particles are able to penetrate, over and over again, into the gap between these two elements, in the case of the known single-lever mixers it is not possible, in the long term, to prevent those regions on the upper side of the closing part which are, at times, masked by the covering part and, at other times, left clear by said covering part, from being scratched or becoming unsightly in some other way.

For this reason WO 89/00275 A1, which likewise describes a sanitary single-lever mixer of the generic type, proposes that the closing part associated with the housing be concealed, once again, under a visible cap. This is naturally relatively expensive.

The present invention is directed to addressing these and other matters.

SUMMARY OF THE INVENTION

An object of the present invention is to redefine a sanitary single-lever mixer of the initially mentioned type in such a way that an aesthetic appearance is guaranteed in the long term.

This object may be achieved, according to the present invention, through the fact that:
f) the covering part associated with the handle is made up of an outer, visible part which is provided with a visible surface, and a sliding part which is connected to said visible part and consists of a material having good sliding properties, and on which the spherical underside is constructed.

Because of the bipartite nature, which is proposed according to the invention, of the covering part which is associated with the handle, the two functions which are assigned to said covering part are apportioned to different elements which can be optimised in a manner specific to the particular function.

The outer, visible part may consist of any desired material, even a hard material, which is best suited to the application of a durable visible surface. The sliding part connected to the visible part, on the other hand, which cannot itself be seen from outside, is selected with a view to obtaining good sliding properties. When its spherical underside slides on the spherical, complementary upper side of the closing part associated with the housing, only very lower frictional forces are produced. The material of the sliding part may also be provided—at least in the region in which it rests on the closing part—with a certain degree of softness, so that particles which get into the gap between the covering part and the closing part can be pressed slightly into the said material. This effectively avoids scratching of the upper side of the closing part.

The visible part preferably consists of metal. The sliding part, on the other hand, preferably consists of plastic, in particular of polyoxymethylene.

That exemplified embodiment of the invention in which the visible part projects beyond the sliding part in the radial direction, but maintains a distance from the upper side of the closing part by means of the protruding rim, is particularly advantageous. In this case, the sliding part, which is not optimised with respect to visible properties, cannot be seen, even when viewed from the side, so that the aesthetics of the mixer's appearance are perceived in a particularly satisfactory manner.

These and other objects and advantages will be made apparent from the following brief description of the drawings and the detailed description of the invention.

DETAILED DESCRIPTION OF THE PRESENT INVENTION

Figure 1:
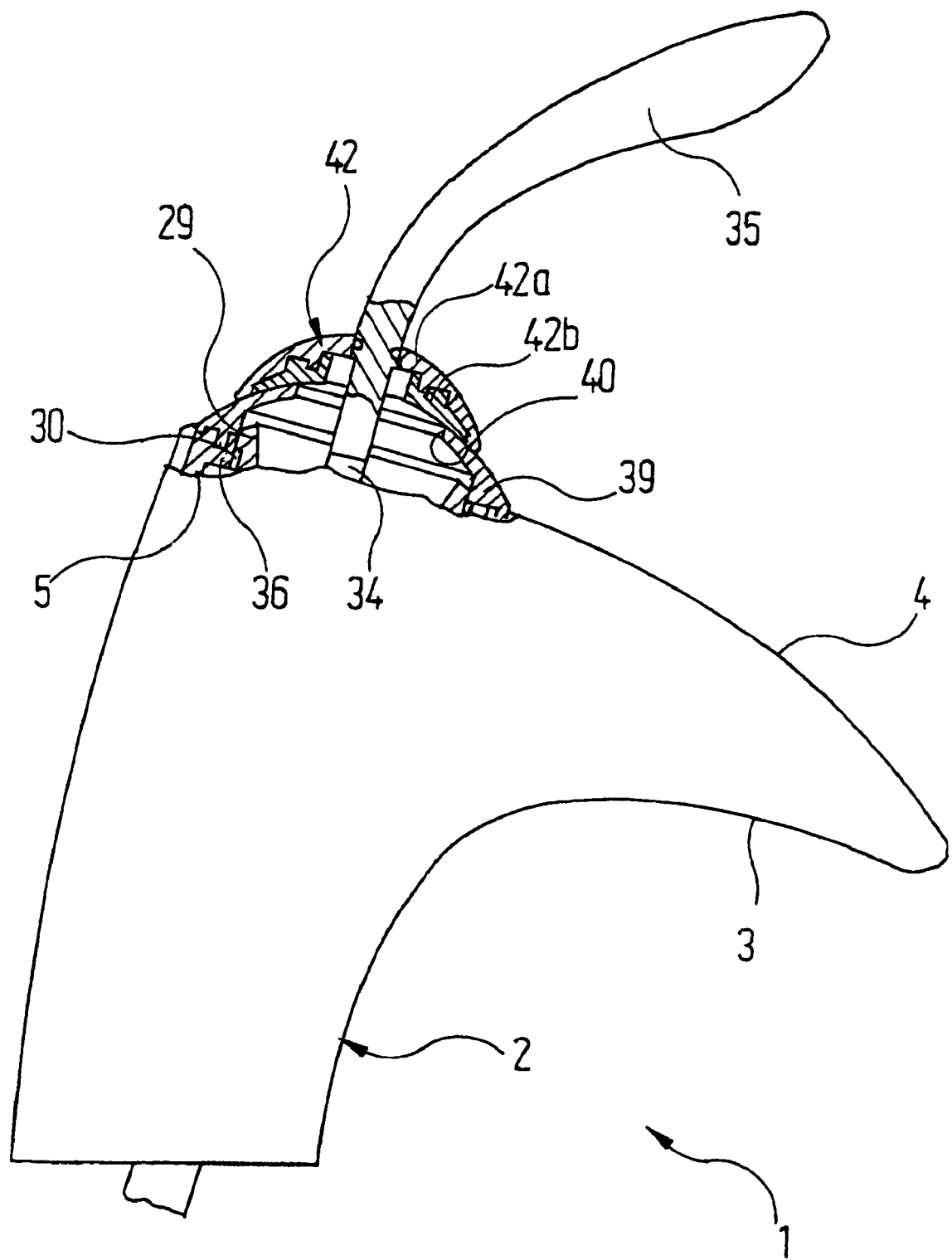
FIG. 1 shows the side view of a sanitary single-lever mixer, partly in section.
Figure 2:
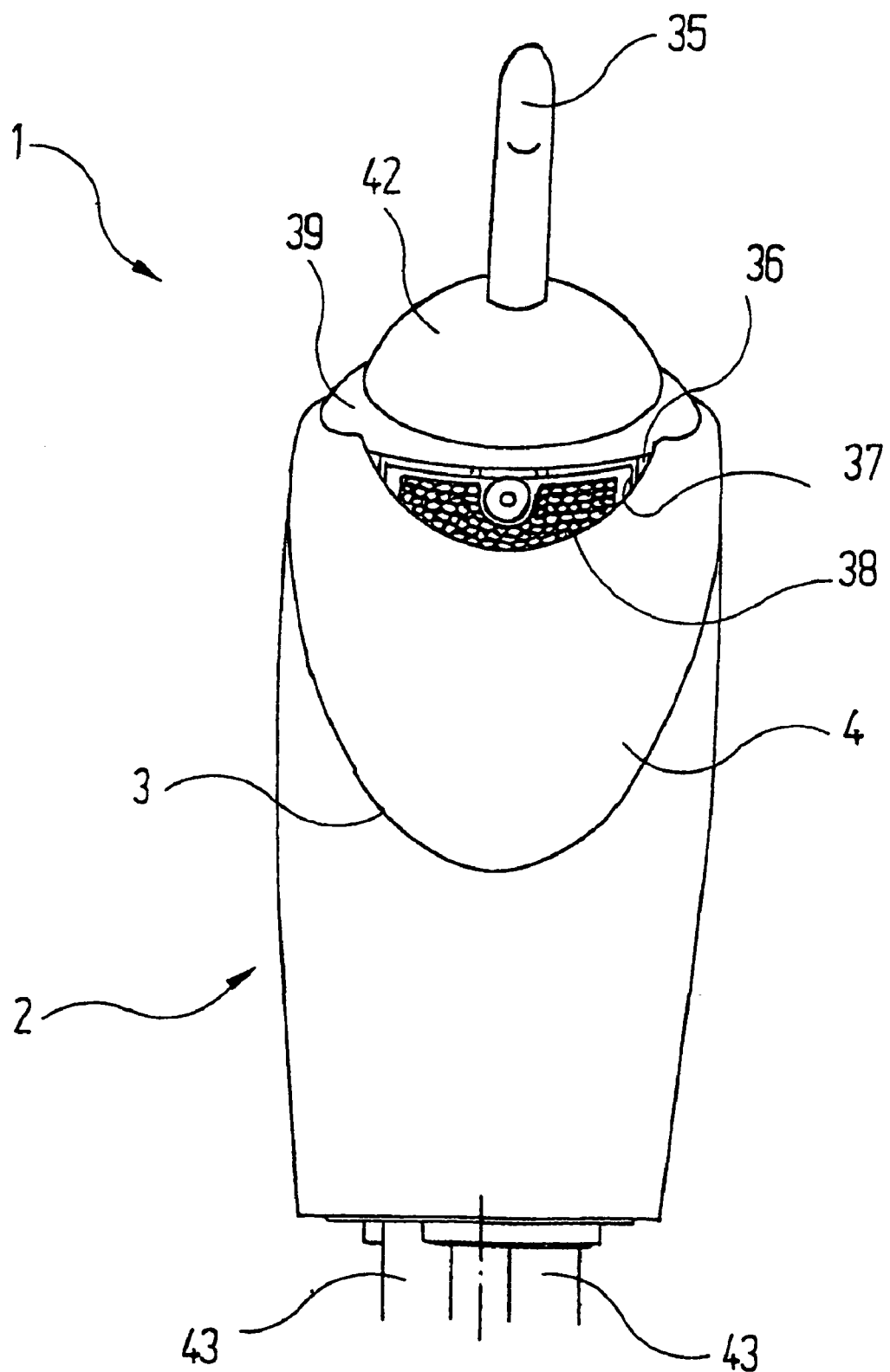
FIG. 2 shows the front view of the sanitary single-lever mixer in FIG. 1.
Figure 3:
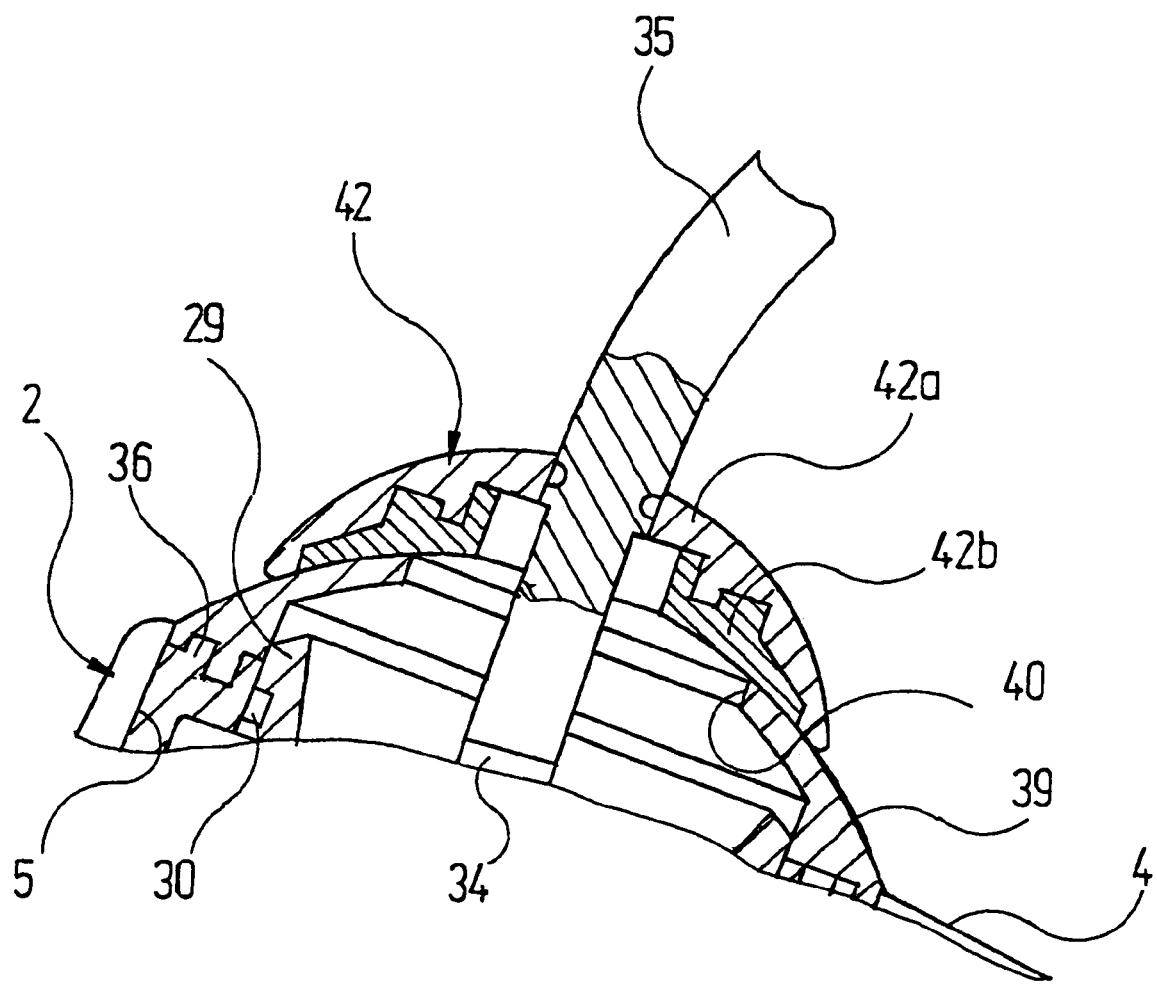
FIG. 3 shows a partial enlargement from FIG. 1 in the region which is cut away therein.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Hollowed out of the housing 2 is a cup-shaped receiving compartment 5 which is open towards the top and in which a control apparatus, which is not visible in the drawings, is disposed. In the present case, said control apparatus is a control cartridge which contains, in known manner, the elements, generally control plates made of ceramics, which control the flow of water.

Projecting upwards from the control cartridge in known manner is an adjusting lever 34 which tilts about an axis perpendicular to the plane of the drawings for the purpose of varying the quantity of water running out, and which can be twisted about an axis lying in the plane of the drawings for the purpose of varying the temperature of said water. Detachably fastened to the adjusting lever 34, in a manner which is of no further interest here, is a handle 35 which passes upwards out of the housing 2 of the washstand fitting 1 and serves for actuation by the user.

Inserted in the upper end region of the receiving compartment 5 in the housing 2 is a ring 36, to the upper end face of which a closing part 39 possessing a spherical upper side is fastened, for example by clipping or bonding. Said closing part has a through-bore 40 which is coaxial with the axis of the receiving compartment 5 and through which the handle 35 extends.

Fastened to the handle 35 is a covering part 42 which is curved in a spherical manner on both the upper side and the underside. The radius of curvature on the underside is essentially identical to the radius of curvature on the upper side of the closing part 39. The covering part 42 comprises an outer, visible part 42a as well as a sliding part 42b which is bonded or clipped to the said visible part 42a.

Said visible part 42a preferably consists of metal and is provided with a visible surface, for example chromium plating. The sliding part 42b consists of a plastic having satisfactory sliding properties, in particular polyoxymethylene. Its diameter is slightly smaller than that of the visible part 42a. Whereas the sliding part 42b slides along, with its concave underside, on the closing part 39, the lower rim of the visible part 42a, which rim lies radially outside the sliding part 42b, is offset upwards slightly, so that the said rim does not rest against the closing part 39.

The abovedescribed configuration of the sanitary single-lever mixer 1, on the one hand, adequately guarantees the leakproof nature of the latter in the upward direction, but at the same time ensures that the movements of the covering part 42, which is connected to the handle 35, over the upper side of the closing part 39 do not lead to impairment of the latter's surface quality.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A sanitary single-lever mixer comprising,
   a) a housing which has a receiving compartment which has an upper aperture;
   b) an adjusting lever for adjusting a flow of water which extends upwards and can be tilted about two axes which are perpendicular to one another;
   c) a handle which is connected, at one end, to the adjusting lever;
   d) a closing part which is associated with the housing, covers the upper aperture and has a central through-aperture through which the adjusting lever or the handle extends, and which closing part possesses an upper side which, viewed from above, is convex and spherical; and,
   e) a covering part which is associated with the handle and faces the upper side of the closing part and has an underside which is spherical and essentially complementary to the upper side of the closing part and slides on said upper side when the handle moves;
   wherein
   f) the covering part associated with the handle is made up of an outer, visible part which is provided with a visible surface, and a sliding part which is connected to said visible part, and on which the spherical underside of said covering part is constructed; and,
   g) the visible part of the covering part projects beyond the sliding part in a radial direction by means of a protruding rim but maintains a distance from the upper side of the closing part at the protruding rim.

2. The sanitary single-lever mixer of according to claim 1, wherein the visible part consists of metal.

3. The sanitary single-lever mixer of claim 1, wherein the sliding part consists of plastic.

4. The sanitary single-lever mixer of claim 2, wherein the sliding part consists of plastic.

5. The sanitary single-lever mixer of claim 4, wherein the plastic includes polyoxymethylene.

6. The sanitary single-lever mixer of claim 4, wherein the plastic includes polyoxymethylene.

7. The sanitary single-lever mixer of claim 3, wherein the plastic includes polyoxymethylene.

8. A sanitary single-lever mixer comprising,
   a) a housing which has a receiving compartment which has an upper aperture
   b) an adjusting lever for adjusting the flow of water which extends upwards and can be tilted about two axes which are perpendicular to one another;
   c) a handle which is connected, at one end, to the adjusting lever;
   d) a closing part which is associated with the housing, covers the upper aperture in the receiving compartment and has a central through-aperture through which the adjusting lever or the handle extends, and which closing part possesses an upper side which, viewed from above, is convex and spherical; and, e) a covering part which is associated with the handle faces the upper side of the closing part and has an underside which is spherical and essentially complementary to the upper side of the closing part and slides on said upper side when the handle moves;
wherein
f) the covering part covers a fraction of the closing part only such that in every position of the adjusting lever a fraction of the convex spherical upper side of the closing part remains visible,
g) the covering part associated with the handle is made up of an outer visible part having a visible surface and a sliding part which is connected to said visible part and comprising the spherical underside of said covering part.

* * * * *